US007793922B2

(12) United States Patent
Hikosaka et al.

(10) Patent No.: US 7,793,922 B2
(45) Date of Patent: Sep. 14, 2010

(54) BOUND STOPPER, BOUND STOPPER ASSEMBLY, AND BOUND STOPPER MOUNTING STRUCTURE FOR VEHICLE BODY

(75) Inventors: Michiharu Hikosaka, Komaki (JP); Yasutaka Fukumoto, Toyota (JP); Takuya Hishinuma, Okazaki (JP); Fumitake Murakami, Toyota (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 400 days.

(21) Appl. No.: 12/027,281

(22) Filed: Feb. 7, 2008

(65) Prior Publication Data

US 2008/0203764 A1 Aug. 28, 2008

(30) Foreign Application Priority Data

Feb. 26, 2007 (JP) .............................. 2007-045219

(51) Int. Cl.
*B62D 25/24* (2006.01)
*B60G 11/22* (2006.01)

(52) U.S. Cl. ................... 267/33; 267/140; 267/141.6; 267/153; 267/220; 267/256; 267/136; 267/292; 267/293; 296/193.01; 280/124.165; 280/124.177; 280/124.179

(58) Field of Classification Search .................. 267/33, 267/37.1–37.3, 476, 265, 259, 256, 292, 267/220, 200, 140, 139, 179; 280/124.179, 280/124.141, 124.165, 124.177; F16F 1/36
See application file for complete search history.

(56) References Cited

U.S. PATENT DOCUMENTS

| 2,732,903 | A | * | 1/1956 | Chayne | 180/352 |
| 5,211,380 | A | * | 5/1993 | Germano | 267/221 |
| 5,308,048 | A | * | 5/1994 | Weaver et al. | 267/220 |
| 5,419,539 | A | * | 5/1995 | Bressler | 267/292 |
| 6,158,726 | A | * | 12/2000 | Coleman et al. | 267/292 |
| 2006/0151928 | A1 | * | 7/2006 | Tamura | 267/219 |

FOREIGN PATENT DOCUMENTS

| JP | 05-086048 U | 11/1993 |
| JP | 09-272317 A1 | 10/1997 |
| JP | 09-300931 A1 | 11/1997 |
| JP | 2004-225799 A1 | 8/2004 |
| JP | 2006-248401 A1 | 9/2006 |

* cited by examiner

*Primary Examiner*—Robert A Siconolfi
*Assistant Examiner*—San Aung
(74) *Attorney, Agent, or Firm*—Burr & Brown

(57) ABSTRACT

A bound stopper provided with a drainage path for draining water that has passed through drainage holes formed in a bottom portion of a bracket. The drainage path is constituted by a recessed portion formed on at least one of a plurality of corresponding portions of a fixing metal fitting and the recessed portion opens outward in a direction perpendicular to an axial direction of the fitting. The corresponding portions are positioned so as to correspond to each of the plurality of the drainage holes, upon the fitting being in contact with the bracket. A locating projection is provided on an outer surface of the corresponding portion different from the corresponding portion having the recessed portion. Insertion of a locating projection into the drainage hole corresponding to the different corresponding portion allows the fitting to be circumferentially positioned such that the corresponding portions correspond to the drainage holes.

15 Claims, 6 Drawing Sheets

BOUND STOPPER, BOUND STOPPER ASSEMBLY, AND BOUND STOPPER MOUNTING STRUCTURE FOR VEHICLE BODY

This application is based on Japanese Patent Application No. 2007-045219 filed on Feb. 26, 2007, the contents of which are incorporated hereinto by reference.

BACKGROUND OF THE INVENTION

1. Field of the Invention

The present invention relates to a bound stopper, a bound stopper assembly, and a bound stopper mounting structure for a vehicle body, and more particularly to a bound stopper, a bound stopper assembly and a bound stopper mounting structure for a vehicle body, in which the bound stopper to be mounted on a vehicle body via a tubular bracket having a bottom portion with a plurality of drainage holes employs a technique for advantageously forming a drainage path for draining water that has passed through the drainage holes.

2. Description of the Related Art

In suspension systems of vehicles such as an automobile, there is conventionally disposed a bound stopper between a supporting member (e.g. an arm or a leaf spring) for supporting vehicle wheels and a vehicle body. The bound stopper prevents the supporting member from excessively moving (oscillating) in a vertical direction and from being abutted or contacted with the vehicle body (e.g. a frame), which are caused by bouncing of the vehicle wheels.

As one type of bound stoppers, there has been known a type of bound stopper, which includes a fixing metal fitting having a tubular portion and a bottom portion and a stopper body that is made of elastic material such as any of various rubbers and polyurethanes extending in an axial direction of the tubular portion of the fixing metal fitting and that is entered into the tubular portion of the fixing metal fitting at an end of the axial direction thereof to be fixed to the fixing metal fitting. In the bound stopper structured as above, when the supporting member is excessively displaced, the supporting member comes into contact with the stopper body made of elastic material, whereby the stopper body is elastically displaced. As a result, displacement of the supporting member is elastically limited.

Such bound stoppers structured as above includes bound stoppers that are each mounted on a vehicle body by fixing a fixing metal fitting to a tubular bracket having a bottom portion and being mounted on a lower surface of a vehicle body so as to be open upward in a state in which an outer surface of the bottom portion of the fixing metal fitting is in contact with an outer surface of a bottom portion of the bracket. Employment of the mounting structure described above provides an advantage in which the contact position of the stopper body of the bound stopper and the supporting member can be arbitrarily and easily changed only by changing the height of the tubular bracket, without changing the height of the bound stopper.

However, when the bound stopper is mounted on the vehicle body via the tubular bracket having the bottom portion as described above, rainwater, muddy water, or the like is likely to enter the bracket from its upwardly opening portion and to remain thereinside. This can cause corrosion, which reduces durability of the bracket, and consequently deteriorates the use durability of the bound stopper.

Under the situation mentioned above, JP-A-2006-248401 discloses a bound stopper in which a plurality of through holes are provided in a bottom portion of a fixing metal fitting which is positioned so as to contact with the bottom portion of a bracket, and a groove portion is provided on an upper surface of a stopper body to communicate with each of the through holes and on a lower surface thereof to communicate with an outside. In this case, the bracket mounted on a vehicle body has a plurality of drainage holes at the bottom portion thereof. The bound stopper is fixed to the bracket, in a state where each through hole is positioned so as to correspond to each drainage hole of the bracket, whereby the through hole and the groove portion form a drainage path communicating with the drainage hole. In this manner, rainwater, muddy water, or the like that has entered into the bracket is drained away through the drainage path by way of the drainage hole.

The conventional bound stopper having the drainage path is a so-called press-fitted type in which a part of the stopper body is fixed to the tubular portion of the fixing metal fitting by press-fitting. Accordingly, in the bound stopper, the groove portion is provided on a portion of the stopper body located inside the tubular portion of the fixing metal fitting. In this case, however, for example, after the stopper body with the groove portion and the fixing metal fitting with the through holes are separately molded, the portion of the stopper body having the groove portions is press-fitted into the tubular portion of the fixing metal fitting, whereby the bound stopper can be produced easily.

There is known another type of a bound stopper, a so-called vulcanization-bonded type, in which a part of the stopper body is entered into the tubular portion of the fixing metal fitting and the entered portion thereof is vulcanized and bonded to each of inner surfaces of the tubular portion and the bottom portion of the fixing metal fitting (see JP-A-2004-225799, for example). In the bound stopper of the vulcanization-bonded type, a force for holding the stopper body by the fixing metal fitting is made sufficiently large, so that an elastic deformation mechanism of the stopper body can be more efficiently exhibited, thereby advantageously achieving a reduction in size of the stopper body, and ultimately of the entire bound stopper. In the bound stopper of the vulcanization-bonded type, however, when forming the foregoing groove portion on the portion of the stopper body entered into the tubular portion of the fixing metal fitting, it is inevitable to make complicated the structure of a mold used for integrally vulcanizing and molding the stopper body and the fixing metal fitting, where the mold may be of a slide-type or may include a pin or the like. This causes not only a problem of a complication of the production work of the bound stopper, but also an increase of a cost burden for the production.

Additionally, in the conventional bound stopper, for either the above press-fitted type or vulcanization-bonded type, when mounted on and fixed to the bracket, the fixing metal fitting is circumferentially positioned with a visual check to confirm individual positions of the plurality of the through holes in the fixing metal fitting and the drainage holes in the bracket, upon the fixing metal fitting being in contact with the bracket, such that the plurality of the through holes correspond to those of the drainage holes, which is a very troublesome work.

SUMMARY OF THE INVENTION

The preset invention was made in the light of the above-described situation. It is therefore an object of the invention to provide a bound stopper having a novel structure in which, in the bound stopper of the vulcanization-bonded type which is mounted on a vehicle body via a tubular bracket having a bottom portion with a plurality of drainage holes formed therein, a drainage path can be easily formed at a low cost to drain away water passed through each of the drainage holes, and a fixing metal fitting can be more easily and surely circumferentially positioned in a predetermined position when fixing the bound stopper to the bracket. Additionally, it is another object of the present invention to provide a bound stopper assembly formed by assembling the bound stopper having the above novel structure and the bracket. It is still another object of the present invention to provide a bound stopper mounting structure for a vehicle body, used for advantageously mounting the bound stopper having the novel structure on the vehicle body.

The above indicated object of the present invention relating to the bound stopper may be attained according to a first aspect of the present invention, which provides a bound stopper including: a fixing metal fitting having a tubular portion and a bottom portion, and a stopper body made of an elastic material extending in an axial direction of the tubular portion of the fixing metal fitting, the stopper body being inserted into the tubular portion of the fixing metal fitting at an axial end portion thereof to be vulcanized and bonded to inner surfaces of the tubular portion and the bottom portion of the fixing metal fitting, the bound stopper being fixed to a tubular bracket having a bottom portion such that an outer surface of the bottom portion of the fixing metal fitting is in contact with an outer surface of the bottom portion of the bracket, the bracket being mounted on the lower surface of a vehicle body so as to be open upward, thereby providing a drainage path for draining water which has passed through a plurality of drainage holes formed in the bottom portion of the bracket, wherein, upon the fixing metal fitting being in contact with the bracket, the drainage path is constituted by a recessed portion formed on at least one of a plurality of corresponding portions on the bottom portion of the fixing metal fitting, each of the corresponding portions being positioned so as to correspond to each of the plurality of the drainage holes, the recessed portion communicating with the drainage hole corresponding to the at least one of the corresponding portions and being open outwardly in a direction perpendicular to the axial direction of the tubular portion of the fixing metal fitting, and wherein a locating projection is provided on an outer surface of the corresponding portion different from the at least one of the corresponding portions having the recessed portion thereon, the locating projection being insertable into the drainage hole corresponding to the different corresponding portion and an insertion of the locating projection into the drainage hole allowing the fixing metal fitting to be circumferentially positioned, upon the fixing metal fitting being contact with the bracket, such that the plurality of the corresponding portions corresponds to the plurality of the drainage holes.

In a preferable form of the bound stopper according to the first aspect of the invention, the plurality of corresponding portions having the recessed portion and the locating projection on the bottom portion of the fixing metal fitting are located at regular intervals in a circumferential direction of the bottom portion thereof.

In another preferable form of the bound stopper according to the first aspect of the invention, the stopper body is composed of a solid block made of the elastic material.

In still another preferable form of the bound stopper according to the first aspect of the invention, a depth of the recessed portion is equal to or smaller than a height of the tubular portion of the fixing metal fitting.

The above-indicated another object of the present invention relating to the bound stopper assembly may be attained according to a second aspect of the present invention, which provides a bound stopper assembly including a bound stopper that includes a fixing metal fitting having a tubular portion and a bottom portion, and a stopper body made of an elastic material extending in an axial direction of the tubular portion of the fixing metal fitting, the stopper body being inserted into the tubular portion of the fixing metal fitting at an axial end portion thereof to be vulcanized and bonded to inner surfaces of the tubular portion and the bottom portion of the fixing metal fitting; and a tubular bracket having a bottom portion being mounted on a lower surface of a vehicle body so as to be open upward, the bound stopper being assembled and fixed to the bracket such that an outer surface of the bottom portion of the fixing metal fitting is in contact with an outer surface of the bottom portion of the bracket, thereby providing a drainage path for draining water that has passed through a plurality of drainage holes formed in the bottom portion of the bracket, wherein, upon the fixing metal fitting being in contact with the bracket, the drainage path is constituted by a recessed portion formed on at least one of a plurality of corresponding portions on the bottom portion of the fixing metal fitting, each of the corresponding portions being positioned so as to correspond to each of the drainage holes, the recessed portion communicating with the drainage hole corresponding to the at least one of the corresponding portions and being open outwardly in a direction perpendicular to an axial direction of the tubular portion of the fixing metal fitting, wherein a locating projection is provided on an outer surface of the corresponding portion different from the at least one of the corresponding portions having the recessed portion thereon, the locating projection being inserted into the drainage hole corresponding to the different corresponding portion, whereby the bound stopper is assembled and fixed to the bracket in a state where the fixing metal fitting being circumferentially positioned, upon the fixing metal fitting being contact with the bracket, such that the plurality of the corresponding portions correspond to the plurality of the drainage holes.

The above-identified still another object of the present invention relating to the bound stopper mounting structure for a vehicle body may be attained according to a third aspect of the present invention, which provides a bound stopper mounting structure for a vehicle body including a bound stopper that includes a fixing metal fitting having a tubular portion and a bottom portion, and a stopper body made of an elastic material extending in an axial direction of the fixing metal fitting, the stopper body being inserted into the tubular portion of the fixing metal fitting at an axial end portion thereof to be vulcanized and bonded to inner surfaces of the tubular portion and the bottom portion of the fixing metal fitting; and a tubular bracket having a bottom portion with a plurality of drainage holes being mounted on a lower surface of the vehicle body so as to be open upward, the bound stopper being assembled and fixed to the bracket such that an outer surface of the bottom portion of the fixing metal fitting is in contact with an outer surface of the bottom portion of the bracket, whereby the bound stopper is mounted on the vehicle body via the bracket, wherein, upon the fixing metal fitting being in contact with the bracket, a drainage path for draining water that has passed through the draining holes is constituted by a recessed portion formed on at least one of a plurality of corresponding portions on the bottom portion of the fixing metal fitting, each of the corresponding portions being positioned so as to correspond to each of the drainage holes, the recessed portion communicating with the drainage hole corresponding to the at least one of the corresponding portions and being open outwardly in a direction perpendicular to an axial direction of the tubular portion of the fixing metal fitting, wherein a locating projection is provided on an outer surface of the corresponding portion different from the at least one of the corresponding portions having the recessed portion thereon, the locating projection being inserted into the drainage hole corresponding to the different corresponding portion, whereby the bound stopper is assembled and fixed to the bracket in a state where the fixing metal fitting being circumferentially positioned, upon the fixing metal fitting being contact with the bracket, such that the plurality of the corresponding portions corresponds to the plurality of the drainage holes.

Unlike the conventional bound stopper including a groove portion forming a drainage path provided on the portion of the stopper body entered into the tubular portion of the fixing metal fitting, the bound stopper according to the first aspect of the present invention includes no groove portion or the like thereon. In the bound stopper according to the first aspect of the present invention, the recessed portion opening perpendicular to the axial direction outwardly is only provided on the bottom portion of the fixing metal fitting, and the recessed portion forms the drainage path for draining away water that has passed through each drainage hole formed in the bottom portion of the bracket. Accordingly, in producing the bound stopper having a structure as above, for example, the stopper body is integrally vulcanized and molded with the fixing metal fitting having the bottom portion with the recessed portion preliminarily formed thereon. In that case, for the integral vulcanizing and molding, it is possible to use a simply designed mold, without any need for using a slide-type mold or a mold with pin. This can obviate problems such as a complicated operation for bound-stopper production and an increased cost burden due to the complicated structure of a mold used for producing the bound stopper.

Additionally, in the bound stopper according to the present invention, it is only necessary to insert the locating projection provided on the bottom portion of the fixing metal fitting into any one of the drainage holes of the bracket in order to circumferentially position the fixing metal fitting being in contact with the bracket, such that each of the recessed portions corresponds to each of the drainage holes. Accordingly, when the fixing metal fitting is assembled and fixed to the bracket, the above structure can advantageously eliminate a need for the troublesome work of determining the position of the recessed portion of the fixing metal fitting so as to correspond to the position of each drainage hole of the bracket with a visual check to confirm the positions thereof. Moreover, in order to perform such a simple locating operation, the drainage hole already formed in the bracket is used as a locating hole to which the locating projection is inserted. Thus, it is unnecessary to provide a new locating hole in the bracket to perform the locating operation.

Therefore, the bound stopper according to the present invention enables the drainage path for draining out the water that has passed through the plurality of drainage holes to be easily formed at a low cost, while ensuring the advantage in a size reduction obtained by bonding the stopper body to the fixing metal fitting by vulcanization. In addition, when fixing the stopper body to the bracket, the fixing metal fitting can be more easily and more surely circumferentially positioned in a predetermined position. As a result, the bound stopper can advantageously improve efficiency of mounting the bound stopper on a vehicle body via the bracket, and furthermore, can effectively increase durability of the bound stopper mounted on the vehicle body.

In both of the bound stopper assembly and the bound stopper mounting structure for a vehicle body according to the second and third aspects of the invention, there can be very effectively obtained substantially the same excellent effects and advantages as those in the foregoing bound stopper according to the first aspect the present invention.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENT

To further clarify the present invention, there will be described in detail an embodiment of the invention with reference to the accompanying drawings.

Figure 1:
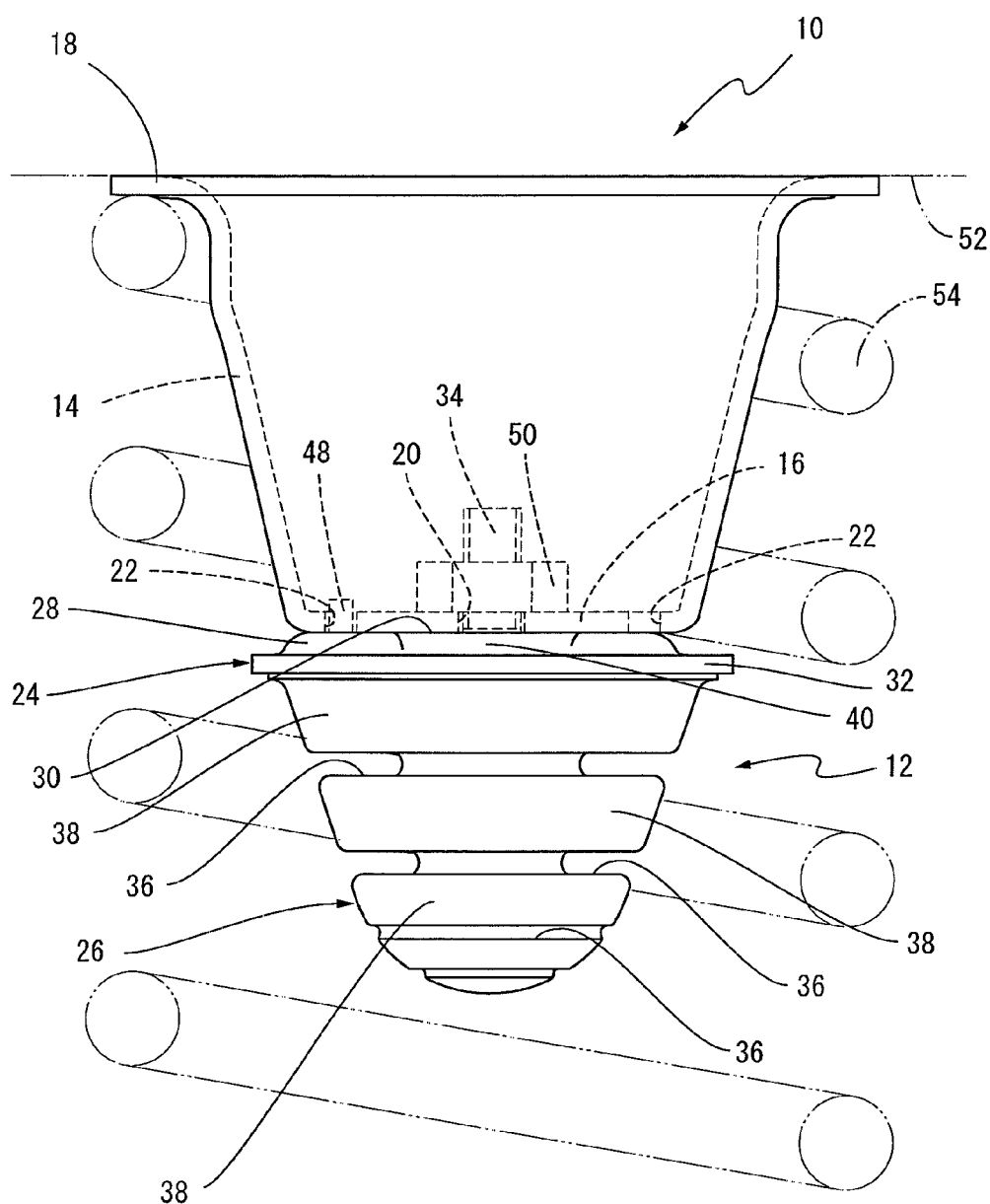
FIG. 1 is a front elevational view of a bound stopper assembly constructed according to an embodiment of the present invention.
Figure 2:
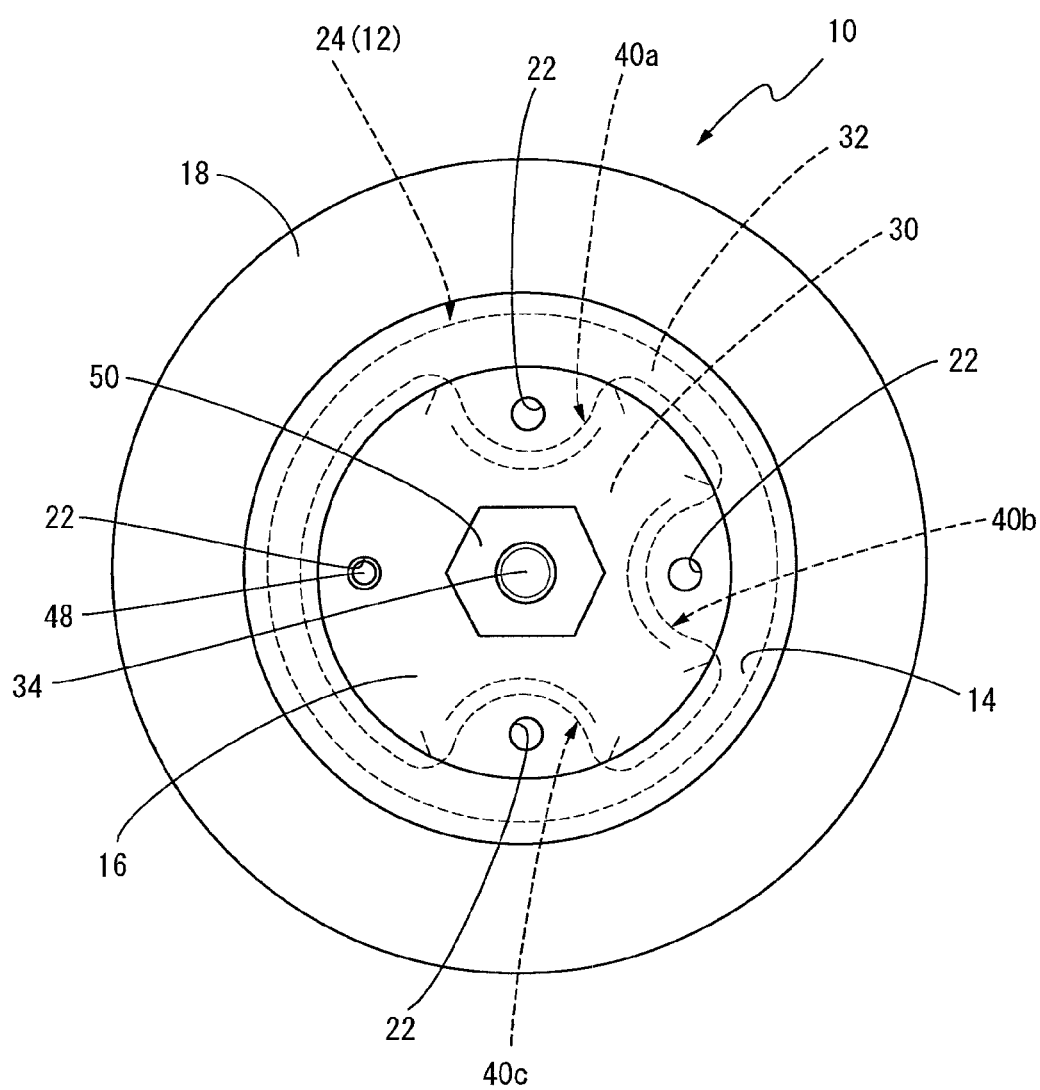
FIG. 2 is a top view of the bound stopper assembly shown in FIG. 1.

Referring first to FIGS. 1 and 2, there is shown a front view and a top view of a bound stopper assembly for an automobile, respectively, as an example of a bound stopper assembly constructed according to an embodiment of the present invention. As apparent from those drawings, the bound stopper assembly of the present embodiment includes a bracket 10 and a bound stopper 12 that are assembled to each other and integrally fixed together. Hereinafter, for convenience of description, a side of the bracket 10 opposite to a side thereof facing the bound stopper 12 and a side of the bound stopper 12 fixed to the bracket 10 are each referred to as "upper" or "upward", whereas a side opposite thereto is referred to as "lower" or "downward".

Figure 3:
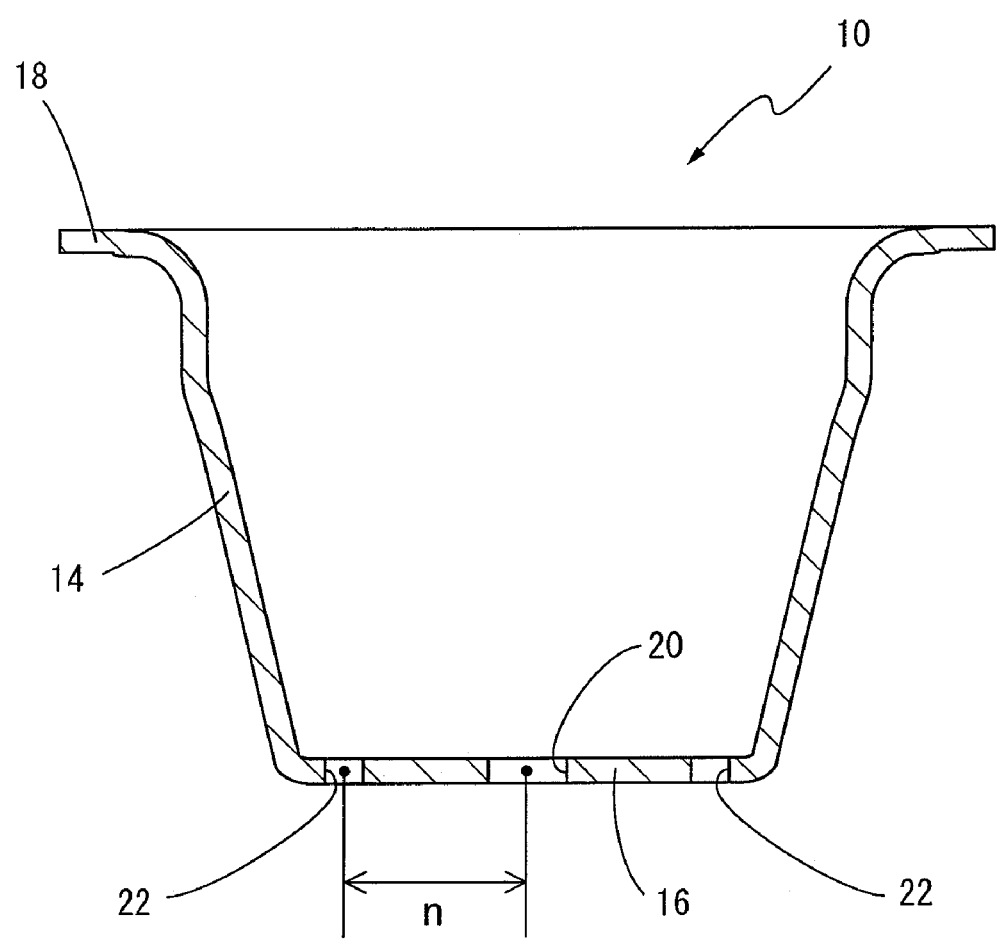
FIG. 3 is an axial cross sectional view of a bracket included in the bound stopper assembly shown in FIG. 1.

Specifically, as shown in FIGS. 1 to 3, the bracket 10 included in the bound stopper assembly is comprised of a metal fitting that integrally has a tubular portion 14 and a lower bottom portion 16 and that, as a whole, has a cylindrical shape having a bottom portion at one side and being open upward. The tubular portion 14 of the bracket 10 has a tapered tubular shape having a diameter gradually increasing upward. On an upper end of the tubular portion 14 having a large diameter thereof, there is integrally formed an upper outer flange portion 18 having an annular disc shape. The flange portion 18 is projected by a predetermined length outwardly in a radial direction thereof and is continuously extended in a circumferential direction thereof.

The lower bottom portion 16 of the bracket 10 formed as above, as a whole, has a disc shape and is integrated with the tubular portion 14 having the tapered tubular shape so as to close a lower opening portion of the tubular portion 14 having a small diameter. At a center portion of the lower bottom portion 16 having the disc shape, a circular-shaped bolt insertion hole 20 that passes therethrough is formed. Additionally, on an outer circumferential portion of the lower bottom portion 16, a total of four circular drainage holes 22 having a smaller diameter than that of the bolt insertion hole 20 is individually formed. Each of the circular drainage holes 22 is provided on a peripheral portion of the lower bottom portion so as to have a circumferential regular interval, which is an angular interval of 90 degrees, and the drainage holes 22 pass through the lower bottom portion 16 in its plate thickness direction.

Figure 4:
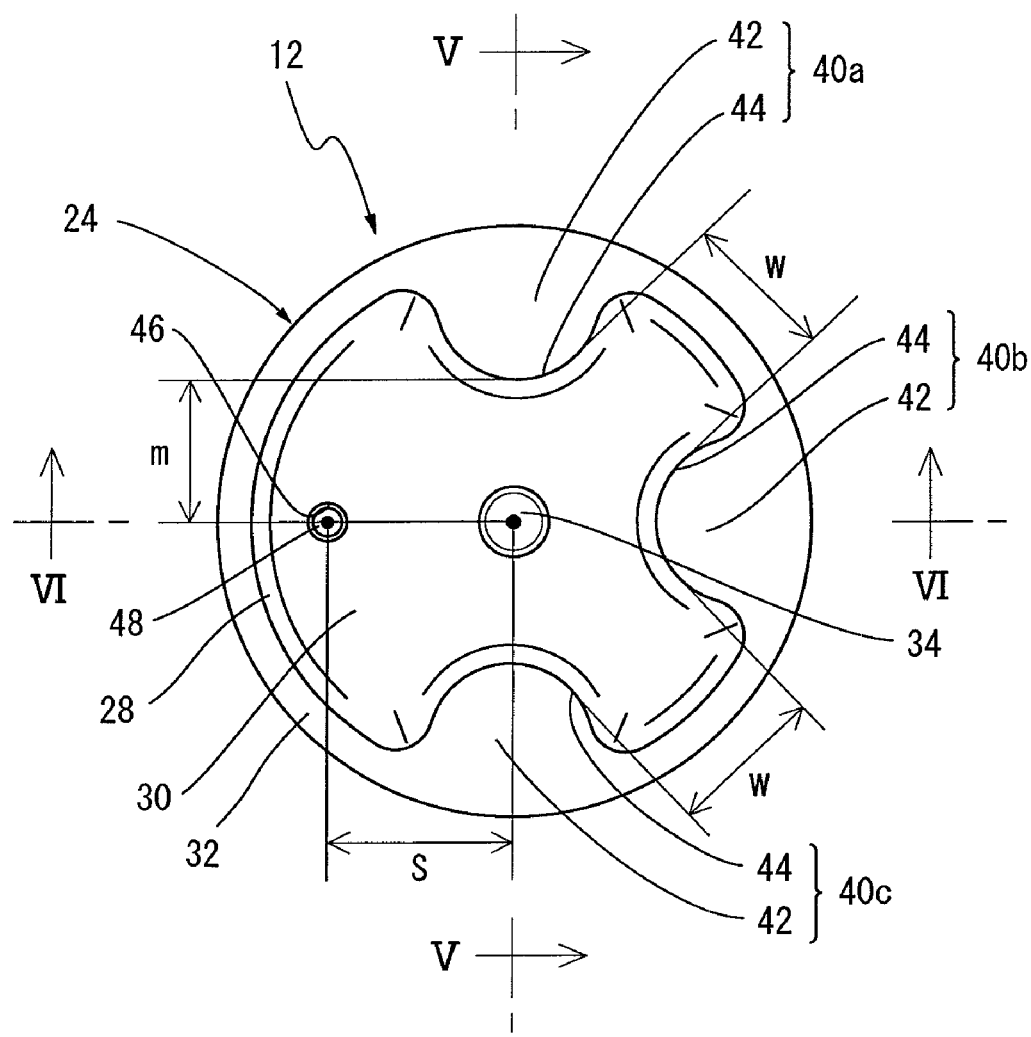
FIG. 4 is a top plan view of a bound stopper included in the bound stopper assembly shown in FIG. 1.
Figure 5:
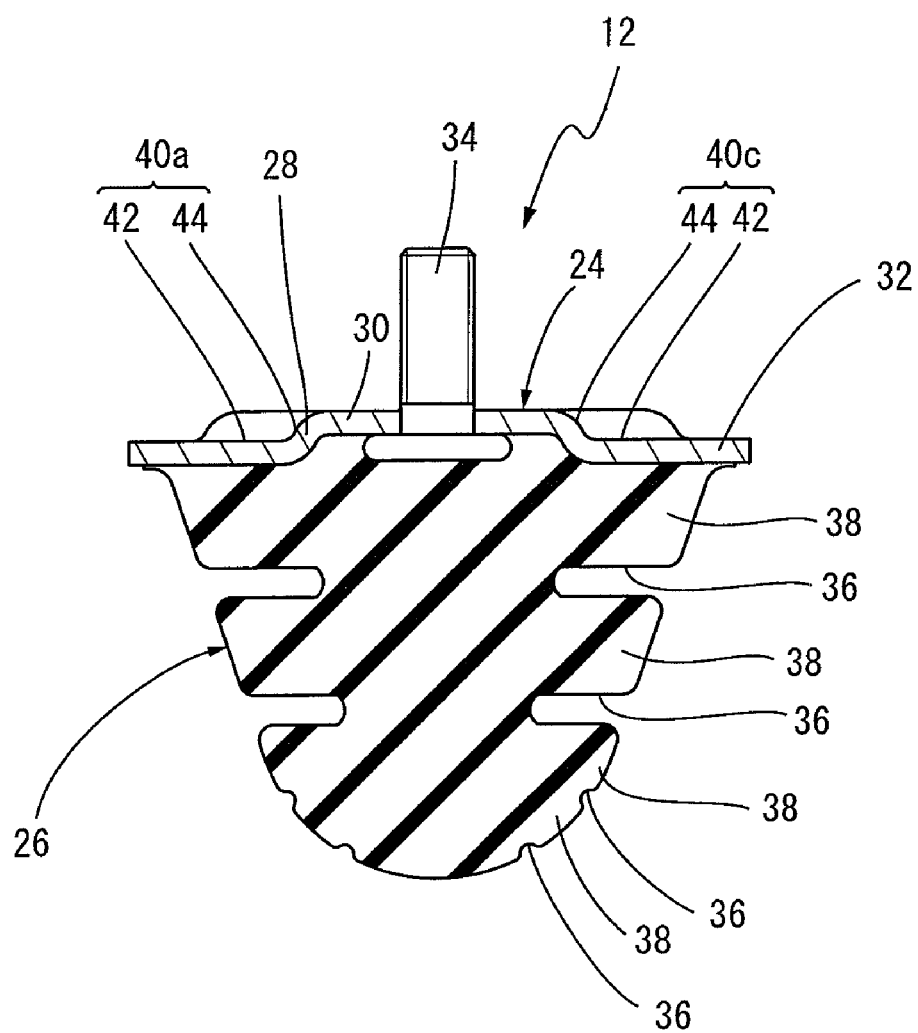
FIG. 5 is a cross sectional view taken along line V-V of FIG. 4.
Figure 6:
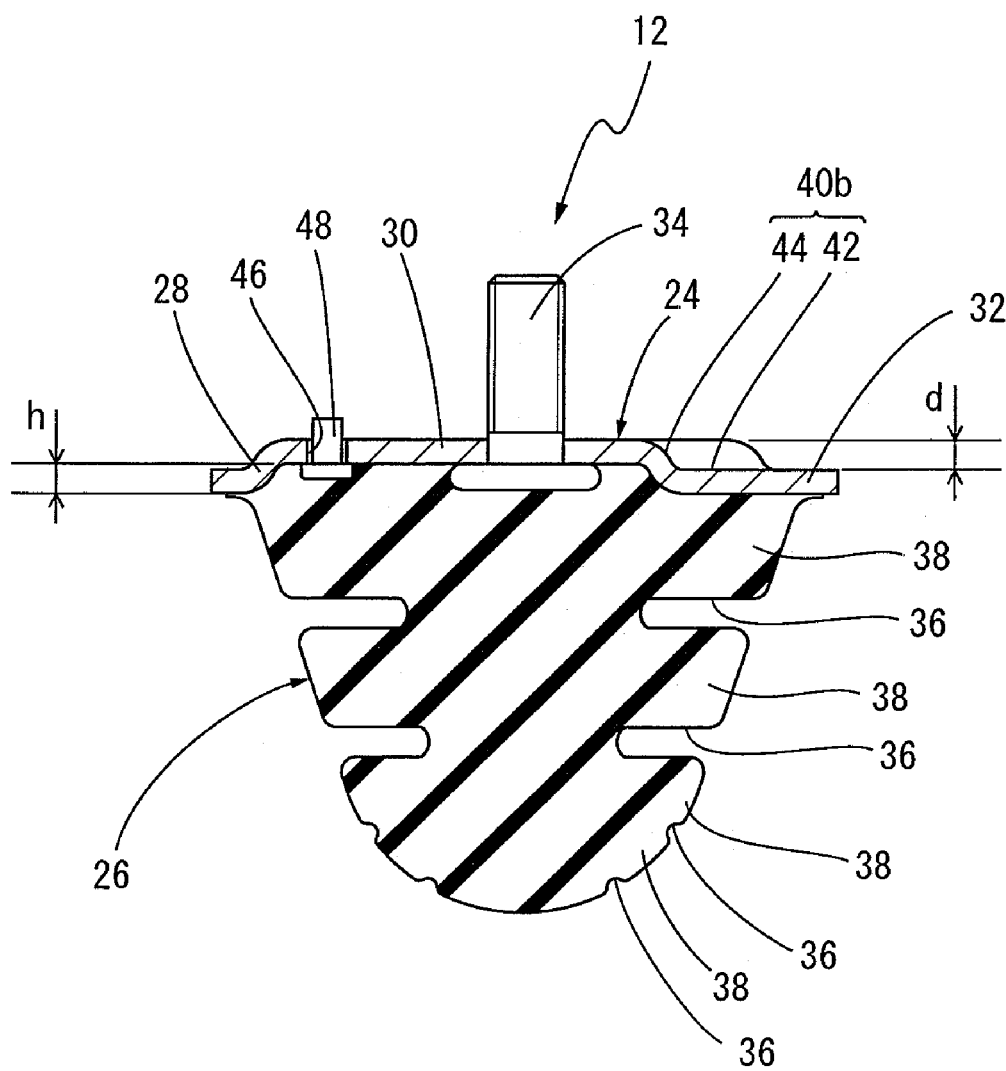
FIG. 6 is a cross sectional view taken along line VI-VI of FIG. 4.

As shown in FIGS. 4 to 6, the bound stopper 12 includes a fixing metal fitting 24 and a stopper body 26. The fixing metal fitting 24 integrally has a tubular portion 28 having a low cylindrical shape and a disc-shaped upper bottom portion 30 with a diameter approximately equal to that of the lower bottom portion 16 of the bracket 10. The fixing metal fitting 24 as a whole has a cylindrical shape having a height lower than that of the bracket 10 and having a bottom at an end thereof or a dished shape with a shallow bottom, which opens downward. Additionally, at a lower end of the tubular portion 28 of the fixing metal fitting 24, a lower outer flange portion 32 having a annular plate shape is integrally provided, which is projected by a predetermined length outwardly in a radial direction thereof and continuously extended in a circumferential direction thereof. Furthermore, at a center portion of the upper bottom portion 30 of the fixing metal fitting 24, a mounting bolt 34 is inserted into a through-hole passing through the center portion of the upper bottom portion 30 and a male screw-threaded leg portion thereof is projected upward from an outer surface (an upper surface) of the upper bottom portion 30, so that the mounting bolt 34 is firmly fixed so as not to move and rotate.

The stopper body 26 of the bound stopper 12 is made of a known elastic material such as one of various rubbers and polyurethanes. The stopper body 26 is composed of generally rounded V-shaped solid block, in which an outer circumferential surface thereof is a tapered tubular surface having a diameter gradually decreasing downwardly and a lower end surface thereof is formed into a convex curved surface comprised of a part of a spherical surface. On an outer circumferential surface of the stopper body 26, there are formed a plurality of ring-shaped grooves 36 extending in a circumferential direction thereof and spaced apart from each other by a predetermined distance in a height direction (an axial direction) thereof. Thereby, portions having the ring-shaped grooves 36 therebetween in the height direction of the stopper body 26 are formed as ring-shaped convex portions 38, 38, which are spaced apart from each other by a predetermined distance in the height direction and are extended continuously in the circumferential direction.

An outer circumferential surface and an upper surface of an upper end portion of the stopper body 26, respectively, have shapes corresponding to shapes of an inner circumferential surface of the tubular portion 28 and an inner surface (a lower surface) of the upper bottom portion 30 of the fixing metal fitting 24. The upper end portion of the stopper body 26 is entered into the tubular portion 28 of the fixing metal fitting 24, and the outer circumferential surface and the upper surface of the upper end portion are vulcanized and bonded to the inner circumferential surface of the tubular portion 28 and an inner surface of the upper bottom portion 30 of the fixing metal fitting 24. Thereby, the bound stopper 12 is formed as an integrally vulcanized molded product comprised of the stopper body 26 and the fixing metal fitting 24.

In the present embodiment, three recessed portions 40a, 40b and 40c which are equally spaced from each other by an angular interval of 90 degrees are provided on an outer circumferential portion of the upper bottom portion 30 of the fixing metal fitting 24 in the bound stopper 12. The each three recessed portions 40a, 40b and 40c have the same shapes and sizes, and a bottom surface 42 of each recessed portion 40a, 40b and 40c is a flat surface flush with an upper surface of the lower outer flange portion 32 of the fixing metal fitting 24. In addition, an inner circumferential surface 44 of each three recessed portions is a recessed curved surface forming a substantially semicircular arc. In short, each recessed portion 40a, 40b and 40c is formed to be open upward on the outer surface (the upper surface) of the upper bottom portion 30 and to be open outward in the radial direction on the outer circumferential surface of the tubular portion 28.

In other words, in this embodiment, three outer circumferential-surface portions which are spaced from each other by an angular interval of 90 degrees on the outer circumferential surface of the cylindrical tubular portion 28 of the fixing metal fitting 24 are formed as the recessed curved surfaces, which are recessed inward in the radial direction so as to form semicircles having the same diameter. The outer circumferential-surface portions comprised of the three recessed curved surfaces form the individual inner circumferential surfaces 44 of the three recessed portions 40a, 40b and 40c. Additionally, on the upper surface of the outer circumferential portion of the fixing metal fitting 24 except for the lower outer flange portion 32, three upper surface portions continued to the three recessed curved surfaces (the inner circumferential surfaces 44) are formed as flat surfaces flush with the upper surface of the lower outer flange portion 32. The upper surface portions comprised of the three flat surfaces form the individual bottom surfaces 42 of the three recessed portions 40a, 40b and 40c. In the three recessed portions 40a, 40b and 40c, respective distances (a size indicated by w in FIG. 4) between a recessed portion 40b, which is positioned in the circumferentially middle of the three recessed portions 40a, 40b and 40c of the fixing metal fitting 24, and each of the recessed portions 40a and 40c, which is positioned at opposite adjacent sides of the middle recessed portion 40b, are made equal.

In the present embodiment, as described above, the bottom surface 42 of each of the recessed portions 40a, 40b and 40c is the flat surface flush with the upper surface of the lower outer flange portion 32, whereby a depth size (a size indicated by d in FIG. 6) of the recessed portion 40a, 40b and 40c is made equal to a height size of the tubular portion 28 of the fixing metal fitting 24, namely, is made equal to a height size or an axial-direction length size (a size indicated by h in FIG. 6) of the upper end portion of the stopper body 26 entered into the tubular portion 28. Additionally, a distance (a size indicated by m in FIG. 4) between a center in a circumferential direction of the inner circumferential surface 44 of each recessed portion 40a, 40b and 40c and a center of the fixing metal fitting 24 (a center of the mounting bolt 34), namely, a minimum value of distance between the inner circumferential surface 44 of each recessed portion and the center of the fixing metal fitting 24 is made smaller by a predetermined size than a distance (a size indicated by n in FIG. 3) between a center of each drainage hole 22 provided in the bracket 10 and a center of the bracket 10.

Furthermore, a pin insertion hole 46 is drilled in a portion of the upper bottom portion 30 located on the radially opposite side of the recessed portion 40b, which is positioned in the middle of the three recessed portions 40a, 40b and 40c, with the center of the fixing metal fitting 24 therebetween, in other words, in the portion of the upper bottom portion 30 which are equally spaced from each other by an angular interval of 90 degrees with respect to the two recessed portions 40a and 40c positioned on the opposite adjacent sides of the middle recessed portion 40b. A locating pin 48 as a locating projection is inserted into and fixed to the pin insertion hole 46. The locating pin 48 has a generally T shape integrally having a leg portion with an outer diameter insertable into the drainage hole 22 formed in the lower bottom portion 16 of the bracket 10 and a head portion with a diameter larger than that of the leg portion. In a state where a tip portion of the leg portion of the locating pin 48 is projected from the pin insertion hole 46 by a predetermined height from the upper surface of the upper bottom portion 30 of the fixing metal fitting 24, the head portion thereof is fixed to a lower surface of the upper bottom portion 30 by welding or the like.

In the embodiment, a distance (a size indicated by s in FIG. 4) between a center of the locating pin 48 and the center of the fixing metal fitting 24 (the center of the mounting bolt 34) is made equal to the distance (the size indicated by n in FIG. 3) between the center of the drainage hole 22 provided in the bracket 10 and the center of the bracket 10.

In the present embodiment, as shown in FIGS. 1 and 2, in a state where the bracket 10 and the bound stopper 12 structured as above are positioned coaxially in a vertical direction in such a manner that the former is on top of the latter, the mounting bolt 34 vertically arranged at the center portion of the upper bottom portion 30 of the fixing metal fitting 24 in the bound stopper 12 is inserted into the bolt insertion hole 20 provided in the center portion of the lower bottom portion 16 of the bracket 10. At the same time, the locating pin 48 vertically arranged on the outer circumferential portion of the upper bottom portion 30 of the fixing metal fitting 24 is inserted into one of the four drainage holes 22 formed in the outer circumferential portion of the lower bottom portion 16 of the bracket 10. Consequently, the lower surface of the lower bottom portion 16 of the bracket 10 is superimposed on the upper surface of the upper bottom portion 30 of the bound stopper 12 such that both surfaces are in contact with each other.

Then, in the above arrangement state, a nut 50 is screwed to the tip portion of the mounting bolt 34 projected upwardly from the bolt insertion hole 20 of the bracket 10, whereby the bound stopper 12 is fixed to the bracket 10 to form the bound stopper assembly.

In this case, while the four drainage holes 22 are positioned so as to equally space from each other by an angular interval of 90 degrees on the lower bottom portion 16 of the bracket 10, the locating pin 48 is positioned so as to equally space from each other by an angular interval of 90 degrees with respect to the two recessed portions 40a and 40c among the three recessed portions 40a, 40b and 40c on the upper bottom portion 30 of the fixing metal fitting 24 in the bound stopper 12. Additionally, the locating pin 48 is located on the radially opposite side of the remaining single recessed portion 40b with the center of the fixing metal fitting 24 therebetween. Accordingly, in the bound stopper assembly structured as above, the mounting bolt 34 and the locating pin 48 are inserted through or inserted into the bolt insertion hole 20 of the bracket 10 and one of the drainage holes 22, respectively, and whereby the lower bottom portion 16 of the bracket 10 and the upper bottom portion 30 of the bound stopper 12 are superimposed together so as to be in contact with each other. In this manner, the bound stopper 12 in the above superimposed state (the contacted state) is circumferentially positioned such that each of the three recessed portions 40a, 40b and 40c corresponds to each of three of the four drainage holes 22, except for the one for inserting the locating pin 48.

More specifically, according to the arrangement, in the state where the lower bottom portion 16 of the bracket 10 is in contact with the upper bottom portion 30 of the fixing metal fitting 24 of the bound stopper 12 so as to fix the bracket 10 and the bound stopper 12 to each other, each one of the three recessed portions 40a, 40b and 40c is provided on each of three corresponding portions of the upper bottom portion 30 of the fixing metal fitting 24, which are positioned so as to correspond to the three of the four drainage holes 22. Each of the recessed portions 40a, 40b and 40c communicates with each of the three drainage holes 22 and opens outward in the radial direction of the fixing metal fitting 24 (an axial perpendicular direction of the bound stopper 12). As a result, at each of the three recessed portions 40a, 40b and 40c, there is provided a drainage path for draining water passed through the drainage hole 22.

In the bound stopper assembly structured as above, while being positioned so as to be open upward, the bracket 10 is fixed onto a lower surface of a vehicle body frame 52 (indicated by a two-dotted chain line in FIG. 1), for example, by welding, fixing with a bolt, or the like. Additionally, in the state of being mounted on the vehicle body frame 52, the bracket 10 is inserted into an inside of a coil spring 54 (indicated by two-dotted chain lines in FIG. 1) interposed between the vehicle body frame 52 and a lower arm (not shown in the drawing) supporting wheels. At the same time, a lower surface of the upper outer flange portion 18 of the bracket 10 is in contact with an upper end portion of the coil spring 54.

Thus, in the bound stopper assembly, in the state of being mounted on the vehicle body frame 52 as described above, the lower arm comes into contact with a tip surface of the stopper body 26 of the bound stopper 12 when the coil spring 54 is excessively compressed and thereby the not-shown lower arm is excessively displaced upwardly. As a result, the stopper body 26 is elastically compressed and deformed in its height direction, whereby the upward displacement of the lower arm can be elastically limited.

In this embodiment, the upper end of the stopper body 26 entered into the tubular portion 28 of the fixing metal fitting 24 is vulcanized and bonded to the inner circumferential surface of the tubular portion 28 and the inner surface (the lower surface) of the upper bottom portion 30. Thus, for example, as compared with a case in which the stopper body 26 is press-fitted into and fixed to the tubular portion 28 of the fixing metal fitting 24, the stopper body 26 is more securely held by the fixing metal fitting 24, so that the stopper body 26 can be efficiently compressed and deformed when abutted with the lower arm. As a result, despite the relatively small size of the stopper body 26, sufficient vibration damping characteristics can be advantageously exhibited when the lower arm is excessively displaced. In addition, the stopper body 26 is composed of the solid block, whereby the stopper body 26 can be efficiently compressed and deformed when abutted with the lower arm as compared with the stopper body 26 composed of a hollow body such as a cylindrical body, for example. As a result, it is also possible to advantageously achieve a size reduction of the stopper body 26 while ensuring the sufficient vibration damping characteristics.

Further, the stopper body 26 has the ring-shaped convex portions 38 located apart from each other by the predetermined distance in the height direction with the ring-shaped grooves 36 arranged therebetween. Thus, during an initial stage of the compressive deformation of the stopper body 26 before the ring-shaped convex portions 38 come into contact with each other, relatively soft spring characteristics are exhibited, whereas sufficiently hard spring characteristics are exhibited upon a further compressive deformation after the ring-shaped convex portions 38 are in contact with each other. This can advantageously prevent an abnormal noise from being generated when the lower arm contacts with the stopper body 26, and simultaneously desired stopper mechanism can be sufficiently ensured.

Furthermore, in the embodiment, particularly, in the state where the bound stopper assembly is mounted on the vehicle body frame 52, rainwater, muddy water, or the like entered into the tubular portion 14 through the upper opening portion of the bracket 10 is guided into the three recessed portions 40a, 40b and 40c provided on the upper bottom portion 30 of the fixing metal fitting 24 of the bound stopper 12 through the three drainage holes 22 formed in the lower bottom portion 16 of the bracket 10, and then drained away from the opening portions open outward in the radial directions of the three recessed portions 40a, 40b and 40c.

As described above, in the present embodiment, the drainage paths for draining water in the tubular portion 14 of the bracket 10 through the drainage holes 22 are formed only by the recessed portions 40a, 40b and 40c provided in the fixing metal fitting 24 of the bound stopper 12, and no drainage path is formed in the stopper body 26. Therefore, when manufacturing the bound stopper 12 including the integrally vulcanized molded product composed of the fixing metal fitting 24 and the stopper body 26, employment of the fixing metal fitting 24 with the preliminarily molded recessed portions 40a, 40b and 40c makes it possible to use a simply designed mold as a mold for integrally vulcanizing and molding the fixing metal fitting 24 and the stopper body 26, without any need for using a slide-type mold or a mold with a pin or the like necessary to form a groove or a hole as a part of the drainage path in the stopper body 26. Accordingly, the bound stopper 12, and furthermore, the bound stopper assembly can be advantageously produced through a simple operation at a maximally reduced cost.

In the present embodiment, when the bracket 10 and the bound stopper 12 are coaxially contacted with each other and then superimposed each other, the locating pin 48 formed on the fixing metal fitting 24 of the bound stopper 12 is inserted into one of the four drainage holes 22 provided in the bracket 10. The circumferential position of the bound stopper 12, upon the bound stopper 12 being in contact (superimposed) with the bracket 10, is determined simply by the insertion of the pin into the hole such that each of the three recessed portions 40a, 40b and 40c corresponds to each of the three drainage holes 22, thereby forming the drainage paths. Thus, in order to determine the circumferential position of the bound stopper 12 upon the bound stopper being in contact with the bracket 10, it is unnecessary to visually confirm the individual positions of the drainage holes 22 and the recessed portions 40a, 40b and 40c. Accordingly, efficiency of the locating operation can be advantageously improved. Thereby, production of the bound stopper 12, and furthermore, of the bound stopper assembly can be effectively facilitated. In addition, since the locating hole for the locating pin 48 is composed of one of the drainage holes 22, it is also possible to obviate a problem such as a complicated structure of the bracket 10 caused by an addition of the locating hole.

Consequently, according to the present embodiment, the bound stopper 12 is formed by the integrally vulcanized molded product comprised of the fixing metal fitting 24 and the stopper body 26, whereby sufficient vibration damping characteristics can be ensured in the small structure, and also a structure for draining water that has entered the bracket 10 can be very advantageously obtained with the simple and low-cost structure. As a result, efficiency of a mounting operation of the bound stopper 12, and furthermore, the bound stopper assembly onto the vehicle body frame 52 can be advantageously improved. Moreover, use durability of the assembly in the state of being mounted on the vehicle body frame 52 can also be effectively improved.

In the present embodiment, the stopper body 26 is composed of the solid block, and the depth size d of each of the recessed portions 40a, 40b and 40c is made equal to the height size h of the upper end portion of the stopper body 26 entered into the tubular portion 28 of the fixing metal fitting 24. Accordingly, due to the formation of the recessed portions 40a, 40b and 40c on the upper bottom portion 30 of the fixing metal fitting 24, a rubber portion excluded from the stopper body 26 as a portion to be elastically deformed is restricted to a part of the upper end portion of the stopper body 26 entered into the tubular portion 28 thereof, in other words, to a part of the upper end portion thereof that is substantially not compressed or deformed because the volume thereof cannot be changed when the stopper body 26 is under elastic compression and deformation. Therefore, in the present embodiment, by forming the recessed portions 40a, 40b and 40c on the upper bottom portion 30 of the fixing metal fitting 24, it can be very advantageously prevented that vibration damping characteristic based on the elastic compression and deformation mechanism of the stopper body 26 is inhibited due to the excessive displacement of the lower arm.

As a result, without any deterioration in the inherent vibration damping characteristic of the bound stopper 12, while sufficiently ensuring the above characteristic, the forgoing embodiment can advantageously exhibit the above especially outstanding function and effect, that is, the improved efficiency of mounting operation of the bound stopper 12, and furthermore, of the bound stopper assembly onto the vehicle body frame 52, and also the improved use-durability thereof in the state of being mounted on the vehicle body frame 52.

Additionally, in the present embodiment, on the outer circumferential portion of the lower bottom portion 16 of the bracket 10, the drainage holes 22 are provided one by one at the positions where the drainage holes 22 are equally spaced from each other by an angular interval of 90 degrees, namely, at each of the positions where they are spaced apart from each other by an equal distance in the circumferential direction. Meanwhile, the single locating pin 48 and the three recessed portions 40a, 40b and 40c are provided at the positions where they are equally spaced from each other by an angular interval of 90 degrees on the outer circumferential portion of the upper bottom portion 30 of the fixing metal fitting 24 thereof, namely, at the positions where they are spaced apart from each other by the equal distance in the circumferential direction. Accordingly, in the state where the bracket 10 and the bound stopper 12 are coaxially positioned in the vertical direction, without selecting a specific one of the four drainage holes 22, the insertion of the locating pin 48 into any one of them allows the bracket 10 to come into contact with the bound stopper 12, thereby positioning the bound stopper 12 easily and surely such that each of the three recessed portions 40a, 40b and 40c corresponds to each of the three drainage holes 22 upon the bound stopper 12 being in contact with the bracket 10. Consequently, the drainage path for draining water in the bracket 10 through each of the drainage holes 22 can be more easily formed.

While the preferred embodiment of the present invention has been described in detail, for illustrative purpose only, it is to be understood that the present invention is not limited to the details of the illustrated embodiment.

For example, the numbers of the recessed portion 40a, 40b and 40c and of the locating pin 48 as the locating projection, which are provided on the upper bottom portion 30 of the fixing metal fitting 24 in the bound stopper 12, are not particularly limited to that of the illustrated embodiment. The numbers thereof may be at least one.

The number of the drainage hole 22 formed in the lower bottom portion 16 of the bracket 10 may also be appropriately changed depending upon the numbers of the recessed portion 40a, 40b and 40c and of the locating pin 48.

The formation positions of the recessed portions 40a, 40b and 40c and of the locating pin 48 on the upper bottom portion 30 of the fixing metal fitting 24 of the bound stopper 12, and the positions of the drainage holes 22 on the lower bottom portion 16 of the bracket 10 are also not limited as long as the recessed portions 40a, 40b and 40c and the locating pin 48 are located so as to correspond to the drainage holes 22 in the state where the upper bottom portion 30 of the fixing metal fitting 24 in the bound stopper 12 is in contact with the lower bottom portion 16 of the bracket 10. Thus, for example, the locating pin 48 as the locating projection may be vertically arranged on any of an inner bottom surface of the recessed portions 40a, 40b and 40c, namely, on the bottom surface 42 of any of the recessed portions 40a, 40b and 40c.

It is obvious that the shapes and sizes of the recessed portions 40, the locating pin 48, and the drainage holes 22 may be appropriately changed.

In the present embodiment, the depth size d of each of the recessed portions 40a, 40b and 40c is made equal to the height size h of the upper end portion of the stopper body 26 entered into the tubular portion 28 of the fixing metal fitting 24. However, the relationship between the depth size d of the recessed portions 40a, 40b and 40c and the height size h of the upper end portion of the stopper body 26 is not strictly limited. Thus, in order to stably maintain the vibration damping characteristic of the bound stopper 12, preferably, the depth size d of each recessed portion 40a, 40b and 40c is equal to or smaller than the height size h of the upper end portion of the stopper body 26 entered into the tubular portion 28 of the fixing metal fitting 24, in other words, the height size of the tubular portion 28 of the fixing metal fitting 24.

The entire shape of the bracket 10, the entire shapes of the fixing metal fitting 24 and the stopper body 26 of the bound stopper 12 are also not particularly limited to the illustrated embodiment.

While the bound stopper and the bound stopper assembly mounted on a vehicle body, and the bound stopper mounting structure for vehicles has been described in details as the example of the present invention, the present invention may also be advantageously applied to any bound stopper and any bound stopper assembly to be mounted on vehicle bodies other than automobile bodies, and to any bound stopper mounting structure for vehicle bodies other than automobile bodies.

It is to be understood that the present invention may be embodied with various other changes and modifications which may occur to those skilled in the art, without departing from the spirit and scope of the invention defined in the following claims.

What is claimed is:

1. A bound stopper comprising: a fixing metal fitting having a tubular portion and a bottom portion, and a stopper body made of an elastic material extending in an axial direction of the tubular portion of the fixing metal fitting, the stopper body being inserted into the tubular portion of the fixing metal fitting at an axial end portion thereof to be vulcanized and bonded to inner surfaces of the tubular portion and the bottom portion of the fixing metal fitting, the bound stopper being fixed to a tubular bracket having a bottom portion such that an outer surface of the bottom portion of the fixing metal fitting is in contact with an outer surface of the bottom portion of the bracket, the bracket being mounted on the lower surface of a vehicle body so as to be open upward, thereby providing a drainage path for draining water which has passed through a plurality of drainage holes formed in the bottom portion of the bracket, wherein, upon the fixing metal fitting being in contact with the bracket, the drainage path is constituted by a recessed portion formed on at least one of a plurality of corresponding portions on the bottom portion of the fixing metal fitting, each of the corresponding portions being positioned so as to correspond to each of the plurality of the drainage holes, the recessed portion communicating with the drainage hole corresponding to the at least one of the corresponding portions and being open outwardly in a direction perpendicular to the axial direction of the tubular portion of the fixing metal fitting, and wherein a locating projection is provided on an outer surface of the corresponding portion different from the at least one of the corresponding portions having the recessed portion thereon, the locating projection being insertable into the drainage hole corresponding to the different corresponding portion and an insertion of the locating projection into the drainage hole allowing the fixing metal fitting to be circumferentially positioned, upon the fixing metal fitting being contact with the bracket, such that the plurality of the corresponding portions corresponds to the plurality of the drainage holes.

2. The bound stopper according to claim 1, wherein the plurality of corresponding portions having the recessed portion and the locating projection on the bottom portion of the fixing metal fitting are located at regular intervals in a circumferential direction of the bottom portion thereof.

3. The bound stopper according to claim 1, wherein the stopper body is composed of a solid block made of the elastic material.

4. The bound stopper according to claim 1, wherein a depth of the recessed portion is equal to or smaller than a height of the tubular portion of the fixing metal fitting.

5. The bound stopper according to claim 1, wherein a mounting bolt vertically arranged on an outer surface of the bottom portion of the fixing metal fitting is inserted into a bolt insertion hole provided in the bottom portion of the bracket so as to fix the bound stopper to the bracket.

6. A bound stopper assembly comprising: a bound stopper including a fixing metal fitting having a tubular portion and a bottom portion, and a stopper body made of an elastic material extending in an axial direction of the tubular portion of the fixing metal fitting, the stopper body being inserted into the tubular portion of the fixing metal fitting at an axial end portion thereof to be vulcanized and bonded to inner surfaces of the tubular portion and the bottom portion of the fixing metal fitting; and a tubular bracket having a bottom portion being mounted on a lower surface of a vehicle body so as to be open upward, the bound stopper being assembled and fixed to the bracket such that an outer surface of the bottom portion of the fixing metal fitting is in contact with an outer surface of the bottom portion of the bracket, thereby providing a drainage path for draining water that has passed through a plurality of drainage holes formed in the bottom portion of the bracket, wherein, upon the fixing metal fitting being in contact with the bracket, the drainage path is constituted by a recessed portion formed on at least one of a plurality of corresponding portions on the bottom portion of the fixing metal fitting, each of the corresponding portions being positioned so as to correspond to each of the drainage holes, the recessed portion communicating with the drainage hole corresponding to the at least one of the corresponding portions and being open outwardly in a direction perpendicular to an axial direction of the tubular portion of the fixing metal fitting, wherein a locating projection is provided on an outer surface of the corresponding portion different from the at least one of the corresponding portions having the recessed portion thereon, the locating projection being inserted into the drainage hole corresponding to the different corresponding portion, whereby the bound stopper is assembled and fixed to the bracket in a state where the fixing metal fitting being circumferentially positioned, upon the fixing metal fitting being contact with the bracket, such that the plurality of the corresponding portions correspond to the plurality of the drainage holes.

7. The bound stopper assembly according to claim 6, wherein the plurality of corresponding portions having the recessed portion and the locating projection on the bottom portion of the fixing metal fitting are located at regular intervals in a circumferential direction of the bottom portion thereof.

8. The bound stopper assembly according to claim 6, wherein the stopper body is composed of a solid block made of the elastic material.

9. The bound stopper assembly according to claim 6, wherein a depth of the recessed portion is equal to or smaller than a height of the tubular portion of the fixing metal fitting.

10. The bound stopper assembly according to claim 6, wherein a mounting bolt vertically arranged on an outer surface of the bottom portion of the fixing metal fitting is inserted into a bolt insertion hole provided in the bottom portion of the bracket so as to fix the bound stopper to the bracket.

11. A bound stopper mounting structure for a vehicle body, the structure comprising:

a bound stopper including a fixing metal fitting having a tubular portion and a bottom portion, and a stopper body made of an elastic material extending in an axial direction of the tubular portion of the fixing metal fitting, the stopper body being inserted into the tubular portion of the fixing metal fitting at an axial end portion thereof to be vulcanized and bonded to inner surfaces of the tubular portion and the bottom portion of the fixing metal fitting; and a tubular bracket having a bottom portion with a plurality of drainage holes being mounted on a lower surface of the vehicle body so as to be open upward, the bound stopper being assembled and fixed to the bracket such that an outer surface of the bottom portion of the fixing metal fitting is in contact with an outer surface of the bottom portion of the bracket, whereby the bound stopper is mounted on the vehicle body via the bracket, wherein, upon the fixing metal fitting being in contact with the bracket, a drainage path for draining water that has passed through the draining holes is constituted by a recessed portion formed on at least one of a plurality of corresponding portions on the bottom portion of the fixing metal fitting, each of the corresponding portions being positioned so as to correspond to each of the drainage holes, the recessed portion communicating with the drainage hole corresponding to the at least one of the corresponding portions and being open outwardly in a direction perpendicular to an axial direction of the tubular portion of the fixing metal fitting, wherein a locating projection is provided on an outer surface of the corresponding portion different from the at least one of the corresponding portions having the recessed portion thereon, the locating projection being inserted into the drainage hole corresponding to the different corresponding portion, whereby the bound stopper is assembled and fixed to the bracket in a state where the fixing metal fitting being circumferentially positioned, upon the fixing metal fitting being contact with the bracket, such that the plurality of the corresponding portions corresponds to the plurality of the drainage holes.

12. The bound stopper mounting structure according to claim 11, wherein the plurality of corresponding portions having the recessed portion and the locating projection on the bottom portion of the fixing metal fitting are located at regular intervals in a circumferential direction of the bottom portion thereof.

13. The bound stopper mounting structure according to claim 11, wherein the stopper body is composed of a solid block made of the elastic material.

14. The bound stopper mounting structure according to claim 11, wherein a depth of the recessed portion is equal to or smaller than a height of the tubular portion of the fixing metal fitting.

15. The bound stopper mounting structure according to claim 11, wherein a mounting bolt vertically arranged on an outer surface of the bottom portion of the fixing metal fitting is inserted into a bolt insertion hole provided in the bottom portion of the bracket so as to fix the bound stopper to the bracket.

* * * * *